United States Patent
Choudhury et al.

(10) Patent No.: US 12,142,270 B2
(45) Date of Patent: Nov. 12, 2024

(54) METHOD AND SYSTEM FOR PROCESSING A DIALOG BETWEEN AN ELECTRONIC DEVICE AND A USER

(71) Applicant: SAMSUNG ELECTRONICS CO., LTD., Suwon-si (KR)

(72) Inventors: Mainak Choudhury, Bangalore (IN); Aravind Kota Gopalakrishna, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 285 days.

(21) Appl. No.: 17/402,227

(22) Filed: Aug. 13, 2021

(65) Prior Publication Data

US 2021/0375286 A1    Dec. 2, 2021

Related U.S. Application Data

(63) Continuation of application No. PCT/KR2020/008929, filed on Jul. 8, 2020.

(30) Foreign Application Priority Data

Jul. 8, 2019 (IN) ............................. 201841040567

(51) Int. Cl.
*G10L 21/00* (2013.01)
*G10L 15/183* (2013.01)
(Continued)

(52) U.S. Cl.
CPC ............ *G10L 15/22* (2013.01); *G10L 15/183* (2013.01); *G10L 15/30* (2013.01); *G10L 2015/221* (2013.01); *G10L 2015/223* (2013.01)

(58) Field of Classification Search
CPC ......... G10L 5/30; G10L 15/183; G10L 15/22; G10L 2015/228; G10L 2015/223;
(Continued)

(56) References Cited

U.S. PATENT DOCUMENTS 7,602,744 B2 * 10/2009 Kaikuranta ........... H04W 4/025
370/335
9,576,574 B2    2/2017 van Os
(Continued)

FOREIGN PATENT DOCUMENTS

JP        3731402 B2 *  1/2006
JP     2016-126294 A    7/2016
(Continued)

OTHER PUBLICATIONS

Communication dated May 17, 2022 issued by the European Patent Office in European Application No. 20837027.0.
(Continued)

*Primary Examiner* — Md S Elahee
(74) *Attorney, Agent, or Firm* — Sughrue Mion, PLLC

(57) ABSTRACT

A method for processing a dialog between a user and an electronic device, including obtaining, by the electronic device, a voice query of the user; providing, by the electronic device, a voice response for the voice query, the voice response including a plurality of portions; identifying, by the electronic device, an occurrence of at least one event while providing the voice response; and modifying, by the electronic device, the voice response to include information about the at least one event.

19 Claims, 14 Drawing Sheets

(51) Int. Cl.
*G10L 15/22* (2006.01)
*G10L 15/30* (2013.01)

(58) Field of Classification Search
CPC ......... G10L 2015/221; G10L 2015/225; G10L 15/1815; G06F 40/35; G06F 1/1694; H04N 21/47202
USPC ........................................................ 704/270
See application file for complete search history.

(56) References Cited

U.S. PATENT DOCUMENTS

| | | | |
|---|---|---|---|
| 9,946,862 | B2 | 4/2018 | Yun et al. |
| 2004/0148164 | A1 | 7/2004 | Baker |
| 2012/0265528 | A1 | 10/2012 | Gruber et al. |
| 2012/0313849 | A1 | 12/2012 | Bak et al. |
| 2013/0110515 | A1 | 5/2013 | Guzzoni et al. |
| 2014/0282003 | A1 | 9/2014 | Gruber et al. |
| 2017/0178626 | A1 | 6/2017 | Gruber et al. |
| 2018/0211652 | A1 | 7/2018 | Mun et al. |
| 2018/0233142 | A1 | 8/2018 | Koishida et al. |
| 2018/0376222 | A1* | 12/2018 | McCarty .......... H04N 21/47202 |
| 2019/0392821 | A1* | 12/2019 | Kline .................. G10L 15/1815 |

FOREIGN PATENT DOCUMENTS

| | | | | |
|---|---|---|---|---|
| KR | 10-2018-0076830 A | 7/2018 | | |
| KR | 10-2018-0089242 A | 8/2018 | | |
| KR | 10-1897492 B1 | 9/2018 | | |
| KR | 1897492 B1 * | 9/2018 | ............. | G06F 3/167 |
| WO | 2014/040022 A2 | 3/2014 | | |

OTHER PUBLICATIONS

Communication issued Sep. 2, 2021 by the Intellectual Property India in Indian Patent Application No. 201841040567.
International Search Report (PCT/ISA/210) dated Oct. 13, 2020 issued by the International Search Authority in International Application No. PCT/KR2020/008929.
Written Opinion (PCT/ISA/237) dated Oct. 13, 2020 issued by the International Searching Authority in International Application No. PCT/KR2020/008929.
Communication issued May 31, 2024 by the European Patent Office for EP Patent Application No. 20837027.0.

* cited by examiner

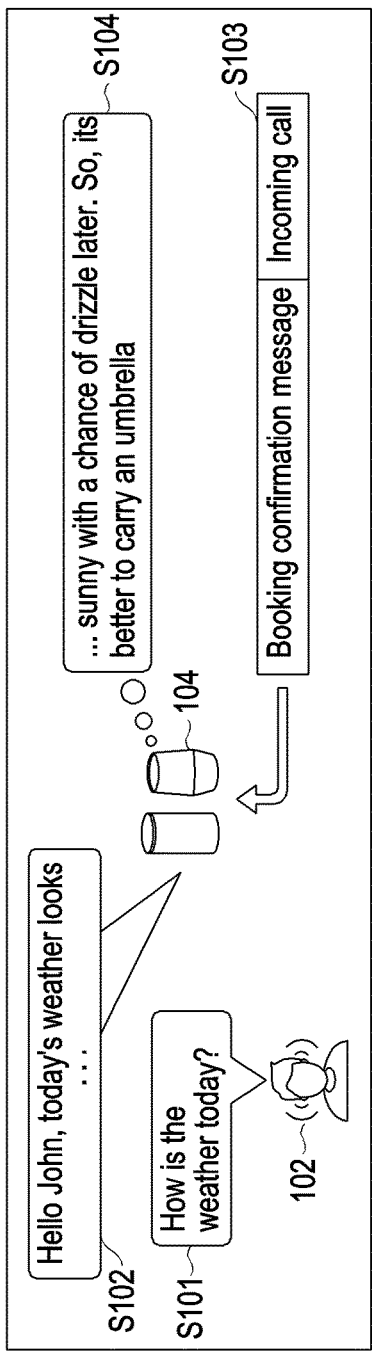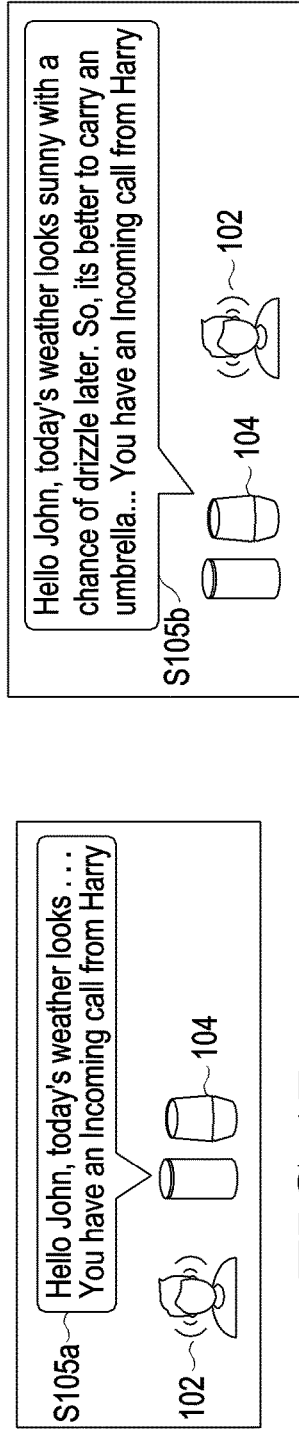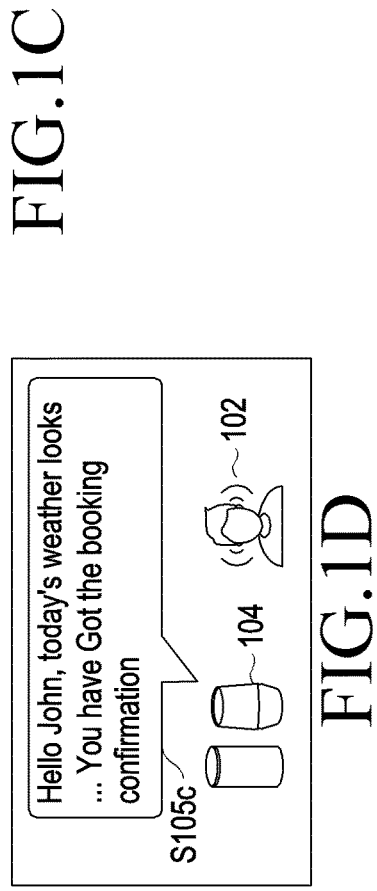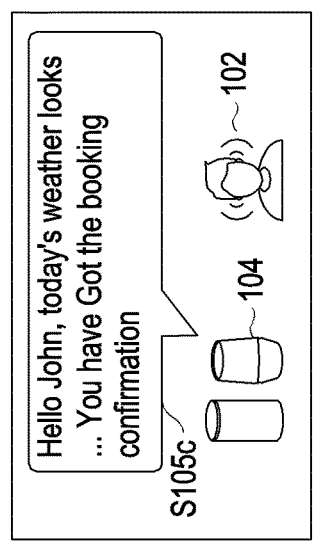

METHOD AND SYSTEM FOR PROCESSING A DIALOG BETWEEN AN ELECTRONIC DEVICE AND A USER

CROSS-REFERENCE TO RELATED APPLICATION(S)

This application is a continuation application of International Application No. PCT/KR2020/008929, filed on Jul. 8, 2020, which is based on and claims priority to Indian Patent Application No. 201841040567, filed on Jul. 8, 2019, in the Indian Intellectual Property Office, the disclosures of which are incorporated by reference herein in their entirety.

BACKGROUND

1. Field

The disclosure relates to communication between an Artificial intelligence (AI) device and a user, and more specifically to a method and system for dialogue enhancement between the user and the AI device.

2. Description of Related Art

AI Assistants such as Alexa™, Google Assistant, and Bixby™ are making user's life easy with voice interactions. Such voice interactions with AI assistant devices works great for small and simple interactions; however it is difficult for, AI assistant to handle plurality of incoming events with priorities and to further communicate the plurality of incoming events to the user.

Multiple AI assistants are available for a user such as a mobile phone, AI Speaker, I-pad, smart Refrigerator etc. However the multiple AI assistants when receives plurality of events simultaneously, does not provide efficient output.

Further, in existing system, when one AI device is in a dialogue mode, the other AI devices may activate their dialogue mode on receiving an event and start conversing with the user, thereby causing disturbance and confusion for the user. Further, in another prior art, the existing systems are not able to determine a suitable waiting time for the incoming event. For example, while conversing with the AI assistant, a user device may receive a call; here the AI assistant is unable to decide a waiting time for communicating the incoming call to the user. The AI device may continue its previous conversation with the user and in the meantime, the call gets disconnected.

Thus, there is a need to address the above mentioned disadvantages or other shortcomings or at least provide a useful alternative.

SUMMARY

Provided are a method for processing a dialog between a user and an electronic device.

Also provided is a method of detecting an occurrence of at least one event while providing a voice response to the user.

Also provided is a method of determining a priority associated with the at least one event and the voice response.

Also provided is a method of providing information about the at least one event and the voice response based on the priority associated with the at least one event and the voice response.

Also provided is a method of modifying the voice response by including the information about the at least one event at least one portion of the plurality of portions of the voice response.

Additional aspects will be set forth in part in the description which follows and, in part, will be apparent from the description, or may be learned by practice of the presented embodiments.

In accordance with an aspect of the disclosure, a method for processing a dialog between a user and an electronic device includes obtaining, by the electronic device, a voice query of the user; providing, by the electronic device, a voice response for the voice query, the voice response including a plurality of portions; identifying, by the electronic device, an occurrence of at least one event while providing the voice response; and modifying, by the electronic device, the voice response to include information about the at least one event.

The modifying of the voice response may include: determining, by the electronic device, a first priority associated with the at least one event and a second priority associated with the voice response; and providing, by the electronic device, the modified voice response including the information about the at least one event, based on the first priority and the second priority.

The providing of the modified voice response may include: comparing the first priority with the second priority; and determining, by the electronic device, whether to provide the information about the at least one event along with the voice response or after the voice response, based on a result of the comparison.

The method may further include based on determining to provide the information about the at least one event along with the voice response, modifying the voice response by including the information about the at least one event in at least one portion of the plurality of portions of the voice response; and providing the modified voice response.

The method may further include, based on determining to provide the information about the at least one event after the voice response, providing the voice response and then subsequently providing the information about the at least one event.

The providing, by the electronic device, the voice response may include: generating the voice response based on the voice query received from the user; and providing the voice response to the user.

The determining of the first priority may include: identifying, by the electronic device, a context of the at least one event; and determining, by the electronic device, the first priority associated with the at least one event based on the context of the at least one event.

The determining of the second priority may include: identifying, by the electronic device, a context of the voice response; and determining, by the electronic device, the second priority associated with the voice response based on the context of the voice response.

In accordance with an aspect of the disclosure, an electronic device for processing a dialog between a user and the electronic device includes a memory storing instructions; and at least one processor coupled to the memory and configured to execute the instructions to: obtain a voice query of the user, provide a voice response for the voice query, the voice response including a plurality of portions, identify an occurrence of at least one event while providing the voice response, and modify the voice response to include information about the at least one event.

The at least one processor may be further configured to execute the instructions to: determine a first priority associated with the at least one event and a second priority associated with the voice response, and provide the modified voice response including the information about the at least one event, based on the first priority and the second priority.

The at least one processor may be further configured to execute the instructions to: compare the first priority with the second priority, determine whether to provide the information about the at least one event along with the voice response or after the voice response, based on a result of the comparison.

The at least one processor may be further configured to execute the instructions to: based on determining to provide the information about the at least one event along with the voice response, modify the voice response by including the information about the at least one event in at least one portion of the plurality of portions of the voice response, and provide the modified voice response, and based on determining to provide the information about the at least one event is to be provided after the voice response, provide the voice response and then subsequently the information about the at least one event.

The at least one processor may be further configured to execute the instructions to: generate the voice response based on the voice query received from the user; and provide the voice response to the user.

The at least one processor may be further configured to execute the instructions to: identify a context of the at least one event; and determine the first priority associated with the at least one event based on the context of the at least one event.

The at least one processor may be further configured to execute the instructions to: identify a context of the voice response; and determine the second priority associated with the voice response based on the context of the voice response.

In accordance with an aspect of the disclosure, non-transitory computer readable medium comprising program code for processing a dialog between a user and an electronic device that, when executed by at least one processor, causes an electronic device to: obtain a voice query of the user; provide a voice response for the voice query, the voice response including a plurality of portions; identify an occurrence of at least one event while providing the voice response; and modify the voice response to include information about the at least one event.

The non-transitory computer readable medium comprising computer code that when executed by the at least one processor to: determine a first priority associated with the at least one event and a second priority associated with the voice response; and provide the modified voice response including the information about the at least one event, based on the first priority and the second priority.

The non-transitory computer readable medium comprising computer code that when executed by the at least one processor to: compare the first priority with the second priority; and determine whether to provide the information about the at least one event along with the voice response or after the voice response, based on a result of the comparison.

The non-transitory computer readable medium comprising computer code that when executed by the at least one processor to: generate the voice response based on the voice query received from the user; and provide the voice response to the user.

The non-transitory computer readable medium comprising computer code that when executed by the at least one processor to: identify a context of the at least one event; and determine the first priority associated with the at least one event based on the context of the at least one event.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A, 1B, IC and 1D are schematic diagrams illustrating example scenario of communication with AI assistant devices, according to related art;

DETAILED DESCRIPTION

Figure 2:
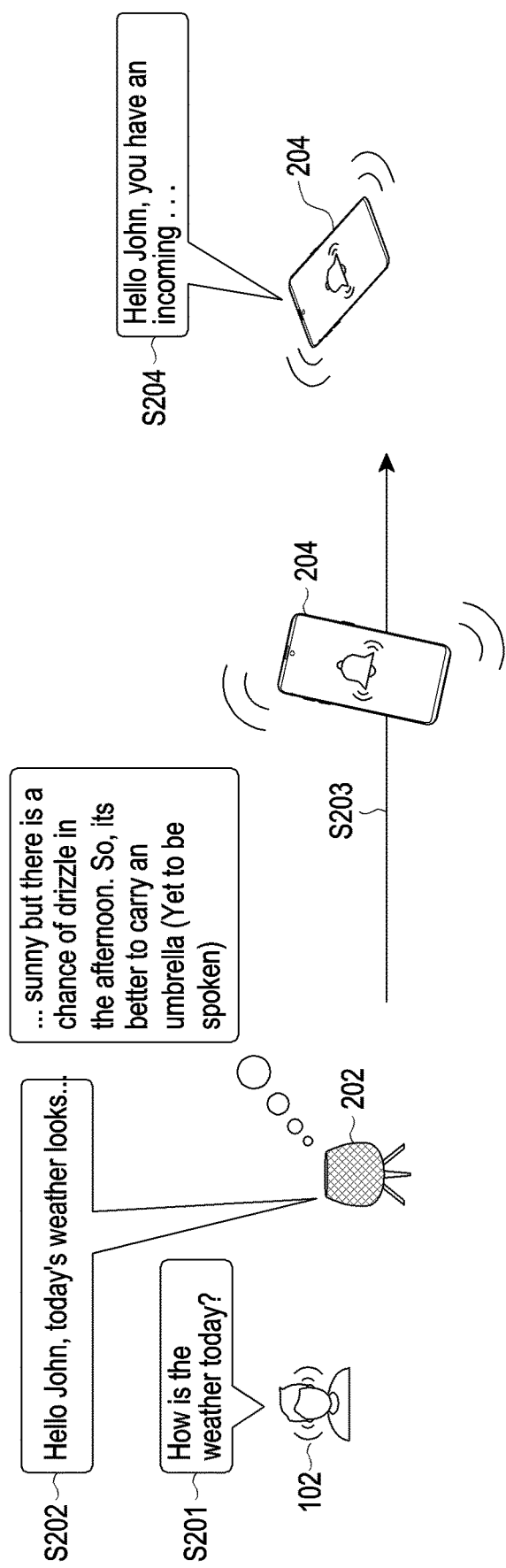
FIG. 2 is a schematic diagram illustrating a plurality of AI assistant devices communicating with the user, according to related art.

Embodiments discussed herein and various features and advantageous details thereof are explained with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Embodiments relate to a method for processing a dialog between a user and an electronic device. The method may include obtaining, by the electronic device, a voice query of the user; providing, by the electronic device, a voice response for the voice query, the voice response including a plurality of portions; identifying, by the electronic device, an occurrence of at least one event while providing the voice response; and modifying, by the electronic device, the voice response to include information about the at least one event. The method further includes determining, by the electronic device, a first priority associated with the at least one event and a second priority associated with the voice response; and providing, by the electronic device, the modified voice response including the information about at least one event, based on the first priority and the second priority.

Figure 3A:
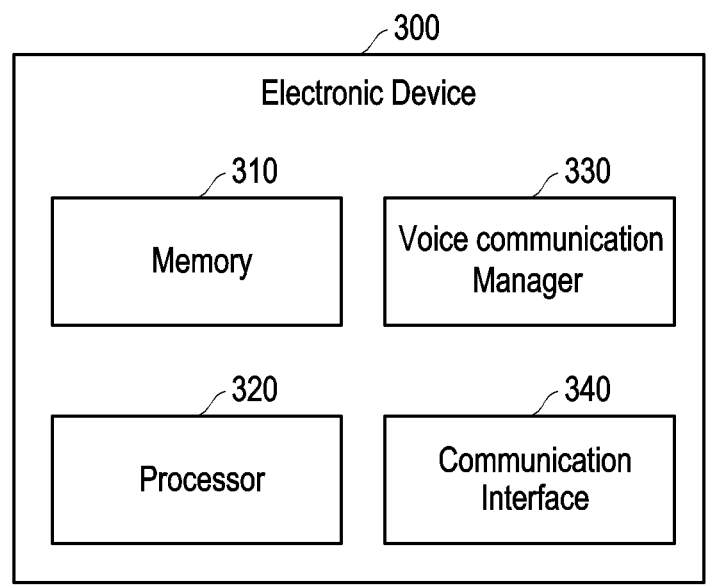
FIG. 3A is a block diagram illustrating an electronic device for processing a dialog with the user, according to an embodiment.

Referring now to the drawings and more particularly to FIGS. 3A. to 9 where similar reference characters denote corresponding features consistently throughout the figures, there are shown various embodiments.

FIGS. 1A, 1B, 1C and 1D are schematic diagrams illustrating exemplary scenario of communication with AI assistant devices, according to related art. As seen in FIG. 1A, the user 102 is communicating with the AI assistant device 104. At S101, the user 102 asks "How is the weather today?" to the AI assistant device 104. At S102, the AI assistant device 104 answers by saying "Hello John, today's weather looks . . . " At S103, while answering the user's question, that is, while communicating with the user 102, the AI assistant device 104 receives an event. in the current scenario the event is a booking confirmation message and an incoming call. The AI assistant device 104 has to decide whether to complete the current sentence "Hello John, today'weather looks . . . " and then inform the user 102 about the booking confirmation message and the incoming call or to terminate the current sentence, and inform the user 102 about the booking confirmation message and the incoming call and then resume the current sentence.

FIGS. 1B, 1C and 1D illustrate different scenarios of conventional systems, of informing the user 102 about the incoming call. As seen in FIG. 1B, at S105a, the AI assistant device 104 terminates the current sentence and informs the user 102 about the incoming call. The AI assistant device 104 says "Hello John, today's weather looks . . . You have an incoming call from Harry". The AI assistant device 104 terminates the answer to the user's first question asking about the weather and abruptly switches from the current communication with the user 102 to informing the user 102 about the incoming call. Thus, the current communication between the user 102 and the AI assistant device 104 is lost.

Further as seen in FIG. 1C, at S105b, the AI assistant device 104 completes the current sentence and informs the user 102 about the incoming call. The AI assistant device 104 says "Hello John, today's weather looks sunny with a chance of drizzle later. So, it's better to carry an umbrella . . . You have an incoming call from Harry", There is a possibility that the incoming call is a very important call and by the time the AI assistant device 104 informs the user 102 about the incoming call, the incoming call may get disconnected. Thus, the AI assistant device 104 does not calculate the delay time properly, due to which the user may lose important calls.

Further, as seen in FIG. 1D, at S105c the AI assistant device 104 terminates the current sentence and informs the user 102 about the booking confirmation message. The AI assistant device 104 says "Hello John, today's weather looks . . . You have got the booking confirmation". The answer to the user's first question asking about the weather is terminated in between. The AI assistant device 104 abruptly switches from the current communication with the user 102 to informing the user 102 about the booking confirmation message. Thus, the current communication between the user 102 and the AI assistant device 104 is lost. Further the AI assistant device 104, has informed the user 102 about the booking confirmation message and not about the call. The incoming call may be important to the user and the booking confirmation message can wait for some time. Thus the AI assistant device 104, has mishandled a priority associated with the incoming call and the booking confirmation message. The AI assistant device 104, should have informed the user 102, about the incoming call first and then about the booking confirmation message.

Thus, from the above states examples, it is necessary to have a system and. method for efficiently handling the communication between the user 102 and the AI assistant device, while informing the AI assistant device 104 about the incoming event.

FIG. 2 is a schematic diagram, illustrating a plurality of AI assistant devices communicating with the user 102, according to the prior art. As shown in FIG. 2, the user 102 is interacting with a first AI assistant device 202 and a second AI assistant device 204. In the current example, the first AI assistant device 202 is an AI speaker and the second AI device 204 is a smart mobile device. As seen in FIG. 2, at S201, the first AI assistant device 202, receives a voice query from the user 102 asking "How is the weather today". The first AI assistant device 202 generates a voice response for the voice query. The voice response generated by the first AI assistant device 202 is "Hello John, today's weather looks sunny but there is a chance of drizzle in the afternoon. So, it's better to carry an umbrella". At S202 the first AI assistant device 202 goes into dialogue mode and starts providing the generated voice response to the user 102 saying "Hello John, today's weather looks . . . ". However, while the first AI assistant device 202 is providing the generated voice response to the user 102, the second AI assistant device 204, receives an incoming call notification at S203. The second AI assistant device 204, goes into dialogue mode and starts providing the incoming call notification information to the user 102, saying "Hello John, you have an incoming . . . " at S204. Here both, the first AI assistant device 202, and the second AI assistant device 204 are in dialogue mode at the same time and communicates with the user 102 simultaneously. The first AI assistant device 202, replies to the user 102 about the weather and simultaneously the second AI assistant device 204 informs the user 102 about the incoming message saying "Hello, John, you have an incoming call". Thus, there arises a problem for the user 102. Therefore, there is a need for system and methods which are able to handle different information sources and their priorities and inform the same to the user 102, by providing the user 102 a human-like experience.

FIG. 3A is a block diagram of an electronic device 300 for processing a dialog between the user 102 and the electronic device 300, according to the embodiments as disclosed herein. The electronic device 300 can be, for example, but not limited to a smart social robot, a smart watch, a cellular phone, a smart phone, a Personal Digital Assistant (PDA), a tablet computer, a laptop computer, a music player, a video player, an Internet of things (IoT) device, a smart speaker, an Artificial intelligent (AI) device or the like. The electronic device 300 includes a memory 310, a processor 320, a voice communication manager 330 and a communication interface 340.

The processor 320 is coupled to the voice communication manager 330, the memory 310 and the communication interface 340. The processor 320 is configured to execute instructions stored in the memory 310 and to perform various other processes.

The memory 310 stores the effect and condition. The memory 310 also stores instructions to be executed by the processor 320. The memory 310 may include non-volatile storage elements. Examples of such non-volatile storage elements may include magnetic hard discs, optical discs, floppy discs, flash memories, or forms of erasable programmable read-only memories (EPROM) or electrically erasable programmable read-only memories (EEPROM). In addition, the memory 310 may, in some examples, be considered a non-transitory storage medium. The term "non-transitory" may indicate that the storage medium is not embodied in a carrier wave or a propagated signal. However, the term "non-transitory" should not be interpreted that the memory 310 is non-movable. In some examples, the memory 310 can be configured to store larger amounts of information than the memory. In certain examples, a non-transitory storage medium may store data that can, over time, change (e.g., in Random Access Memory (RAM) or cache).

The communication interface 340 is configured for communicating internally between internal hardware components and with external devices via one or more networks.

In an embodiment the electronic device 300 receives voice queries from the user 102. The voice queries may be for example but not limited to the user 102 asking about the weather, the user 102 asking about a map route, query related to different scenarios such as ticket booking, media information, information related to superstars and the like.

After receiving the voice query from the user 102, the voice communication manager 330 detects the voice query and generates a voice response for the voice query. After generating the voice response, the voice communication manager 330, provides the voice response to the user 102. In an embodiment, the electronic device 300 speaks out the voice response to the user 102. The voice response generated by the voice communication manager 330 may be for example but not limited to, providing the user 102, information related to a sports event, ticket availability, superstar information, weather report and the like. The voice response generated by the electronic device 300 includes a plurality of portions.

In an example scenario, where the voice response relates to providing information about the weather to the user 102. The generated voice response may be "Hello John, the weather looks sunny, with a chance of drizzle later." Accordingly, the generated voice response includes plurality of portions such as "Hello John" being a first portion of the voice response, "the weather looks sunny" being a second portion and "with a chance of drizzle later" being a third portion, The electronic device 300, may receive a plurality of events while providing the voice response to the user 102. The electronic device 300 is configured to detect an occurrence of the events while responding to the user's query. The event occurring on the electronic device 300 may be for example but not limited to an incoming call, a text message, a notification on the electronic device 300 and the like. Based on the event, the electronic device 300 modifies the voice response.

In another embodiment, after detecting the occurrence of the events, voice communication manager 330 determines a priority associated with the events and the generated voice response. Based on the priority of the events and the generated voice response, the voice communication manager 330, provides the information about the events and the remaining generated voice response to the user 102.

Figure 3B:
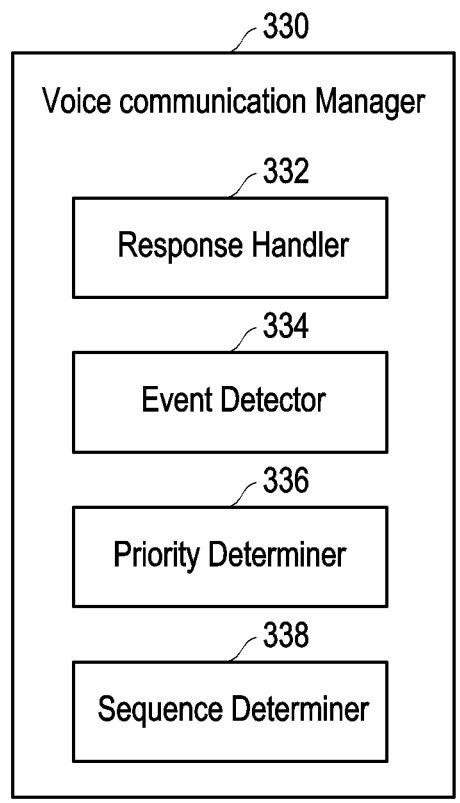
FIG. 3B is a block diagram illustrating the voice communication manager for processing a dialog between the user and the electronic device, according to an embodiment.

FIG. 3B is a block diagram of the priority based on the voice communication manager 330. The voice communication manager 330 includes a response handler 332, an event detector 334, a priority determiner 336, and a sequence determiner 338. In embodiments, the voice communication manager 330, the response handler 332, the event detector 334, the priority determiner 336, and the sequence determiner 338 may be included in or implemented by one or more processors, for example processor 320.

The response handler 332 generates the voice response for he voice query from the user 102 and provides the generated voice response to the user 102. The event detector 334 detects occurrence of the event on the electronic device 300 After detecting the occurrence of the event, the response handler 332 modifies the generated voice response to include the information about the event.

Further in another embodiment, after detecting occurrence of the event, the priority determiner 336 determines the priority associated with the events and the generated voice response.

In an embodiment, the priority determiner 336 recognizes a context of the event and determines the priority associated with the event based on the context of the event. Further the priority determiner 336 recognizes a context of the generated voice response and determines the priority associated with the generated voice response based on the context of the voice response.

After determining the priority associated with the generated voice response and the event, the sequence determiner 338 determines a sequence of providing the generated voice response and the information related to the event to the user 102.

In an embodiment the sequence determiner 338 determines whether the information about the event is to be provided along with the voice response or after the providing the voice response based on the priority associated with the event and the voice response.

In an embodiment, if the sequence determiner 338 determines that the information about the event is to be provided along with the voice response, then the response handler 332 modifies the generated voice response by including the information about the event at one portion of the plurality of portions of the voice response.

In another embodiment, if the sequence determiner 338 determines that the information about the event is to be provided after providing the voice response to the user 102, then the response handler 332 completes providing the generated voice response first and then provides the information about the event to the user 102.

FIGS. 3A and 3B show an example overview of the electronic device 300, but it is to be understood that other embodiments are not limited thereto. Further, the electronic device 300 may include any number of hardware or software components communicating with each other. By way of illustration, both an application running on the electronic device 300 and the device itself can be a component.

Figure 4:
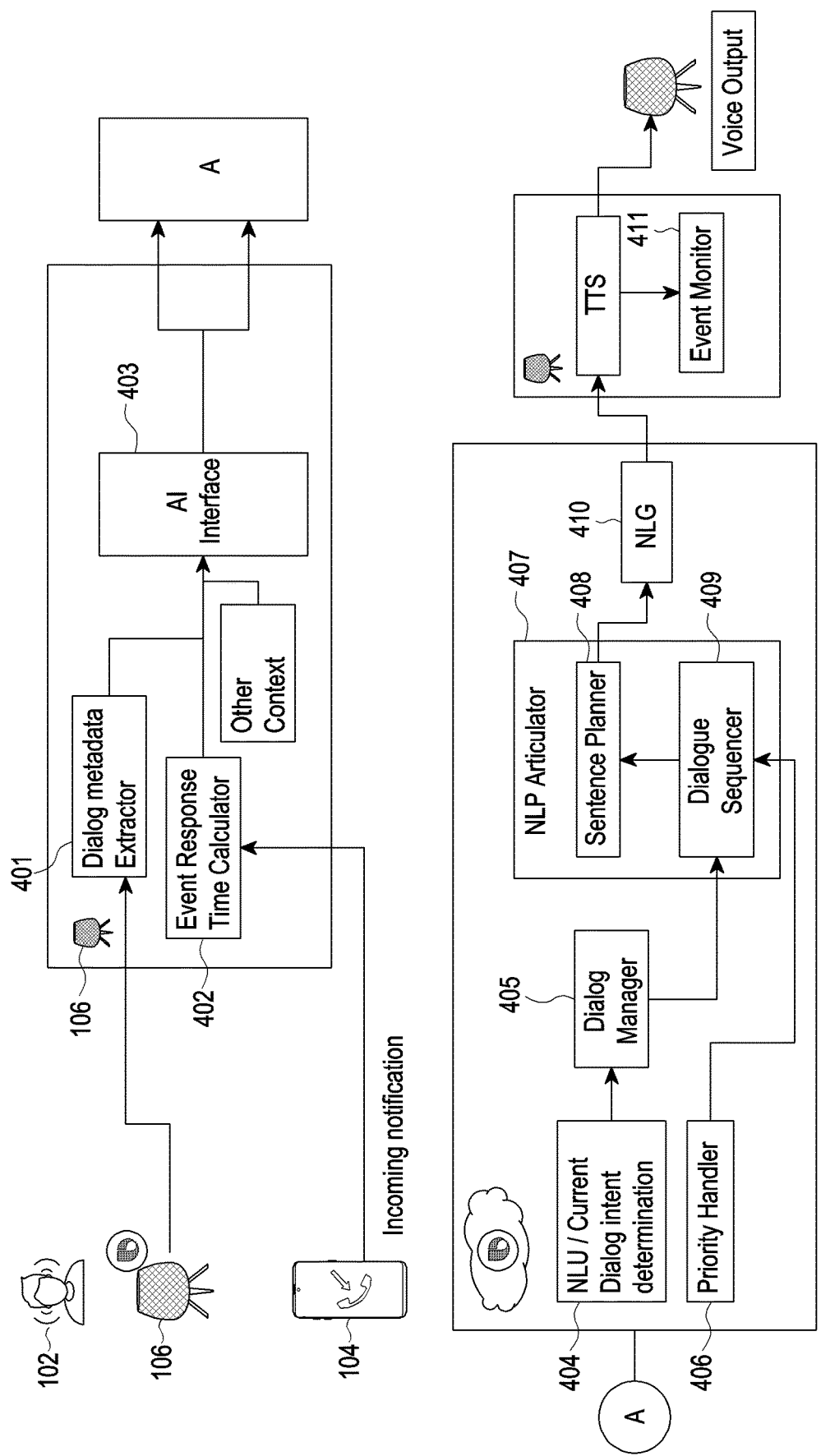
FIG. 4 is a block diagram illustrating a method for processing a dialog between the user and the electronic device, according to an embodiment.

FIG. 4 is a system diagram, illustrating a data flow for processing a dialog between the user and the electronic device, according to an embodiment as disclosed herein. FIG. 4 illustrates user 102, AI assistant device 106, and mobile device 104. In an embodiment, the AI assistant device 106 may receive a voice query from the user 102. A dialogue metadata extractor 401 generates a voice response for the voice query. The AI assistant device 106 provides the generated voice response, however while communicating with the user 102, the mobile device 104 receives an incoming call notification. After receiving the incoming call notification, an event response time calculator 402 calculates a dialogue coverage time. A dialogue coverage time calculator determines the amount of dialogue spoken by the AI assistant device 106. Further the event response time calculator 402 calculates event response maximum delay time and also collects information about other context, such as a user's recent interaction, calls, mug, IoT events etc. All of this is provided to an AI interface 403. The current dialog intent is determined using natural-language understanding (NLU) 404 and dialog manger 405, and a priority handler 406 determines a priority associated with the incoming event. The priority handler 406 is also responsible for reassigning priorities for the events based on the feedback from user either directly or indirectly. A natural language processing (NLP) articulator 407 including a sentence planner 408 and a dialogue sequencer 409 generates a dialogue along with a natural language generator (NLG) 410. An event monitor 411 determines that the event is over and resumes the previous dialogue while providing the new dialogue.

Figure 5:
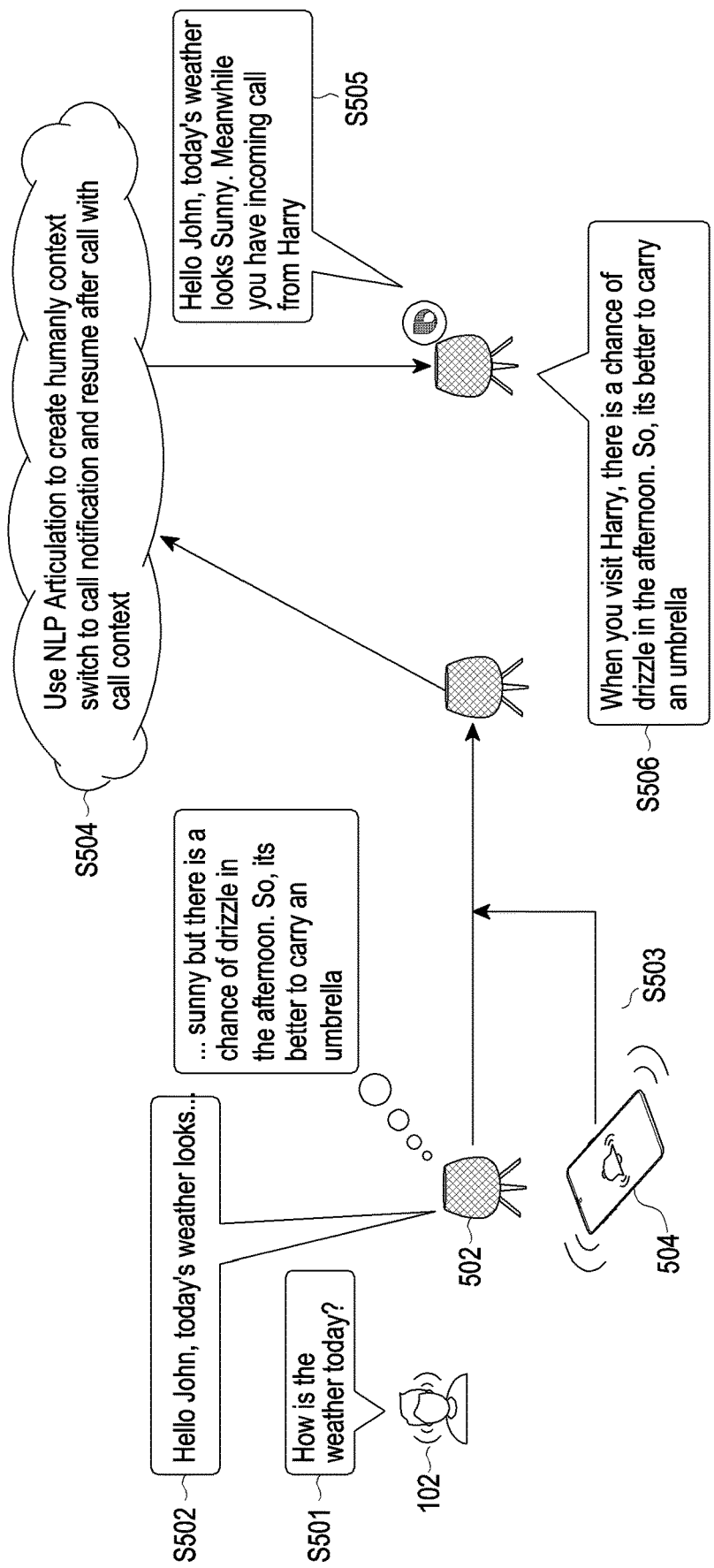
FIG. 5 is a schematic diagram illustrating an example scenario for processing a dialog between the electronic device and the user according to an embodiment.

FIG. 5 is a schematic diagram illustrating the flow for the proposed method using an exemplary scenario according to an embodiment as disclosed herein. FIG. 5 shows a plurality of electronic devices. As seen in FIG. 5, 502 is a first electronic device, and 504 is a second electronic device. In an embodiment the first electronic device 502 is a speaker, and the second electronic device 504 is a mobile device including an application communicating with the user 102. The electronic device 502 and 504 are communicatively coupled with each other.

As seen in FIG. 5 at step S501, the electronic device 502 receives a voice query from the user asking "How is the weather today?". The electronic device 502 generates a voice response for the voice query. The generated voice response is "Hello John, today's weather looks sunny, but there is a chance of drizzle in the afternoon. So, it's better to carry an umbrella.". The voice response includes a plurality of portions. The first portion of the voice response is "Hello John, Today's weather looks sunny", second portion of the voice response is "but there is a chance of drizzle in the afternoon" and of third portion of the voice response is "So, it's better to carry an umbrella.".

At step S502, the electronic device 502 provides the generated voice response by saying "Hello John, Today's weather looks . . . ". At step S503, while providing the generated voice response to the user's voice query, that is, while communicating with the user 102, the electronic device 504 receives an incoming call notification. At step S503, the electronic device 502 determines the priority associated with the incoming call and the priority associated with the voice response. At step S504, the electronic device 502, determines that the incoming call has a higher priority than the ongoing voice response. The electronic device 502 uses natural language programming and articulates the ongoing voice response to include the information about the incoming call. The electronic device 502 includes the information of the incoming call after the first portion of the plurality of portions of the generated voice response. As seen in FIG. 5 at step S505, the electronic device continues the voice response saying "Hello John, today's weather looks Sunny. Meanwhile you have incoming call from Harry". The user 102, after listening about the incoming call, takes the call. At step S506, the electronic device 502, monitors the user's call conversation and extracts the information during the call. In the current example, the information extracted from the call conversation states that the user 102 is visiting Harry in afternoon. After extracting the information, at step S507, the electronic device 502 further articulates and modifies the response by saying "When you visit Harry, there is a chance of drizzle in the afternoon. So it's better to carry an umbrella.".

Thus as seen from the above example, the electronic device 502, had generated the voice response "Hello John, Today's weather looks sunny, but there is a chance of drizzle in the afternoon. So, it's better to carry an umbrella", before receiving the incoming call notification. However, after receiving the call notification, the electronic device provides the voice response saying "Hello John, Today's weather looks Sunny. Meanwhile you have incoming call from Harry". Further, after extracting the call conversation information, the electronic device further modifies the voice response saying "When you visit Harry, there is a chance of drizzle in the afternoon. So it's better to carry an umbrella". Therefore, the electronic device 502 efficiently modified the generated voice response by including the incoming call notification and the information extracted from the call conversation.

Figure 6A:
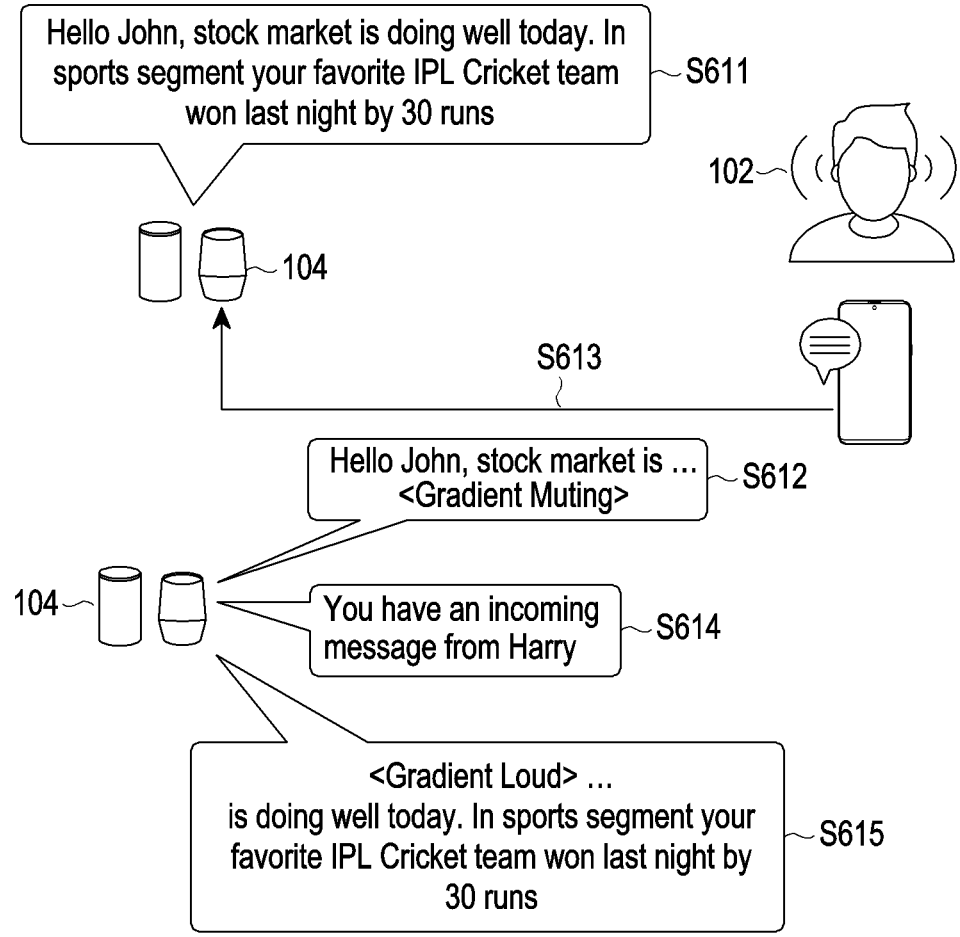
FIGS. 6A and 6B show the schematic diagrams, illustrating example for handling incoming message on the electronic device by AI assistants, according to an embodiment.
Figure 6B:
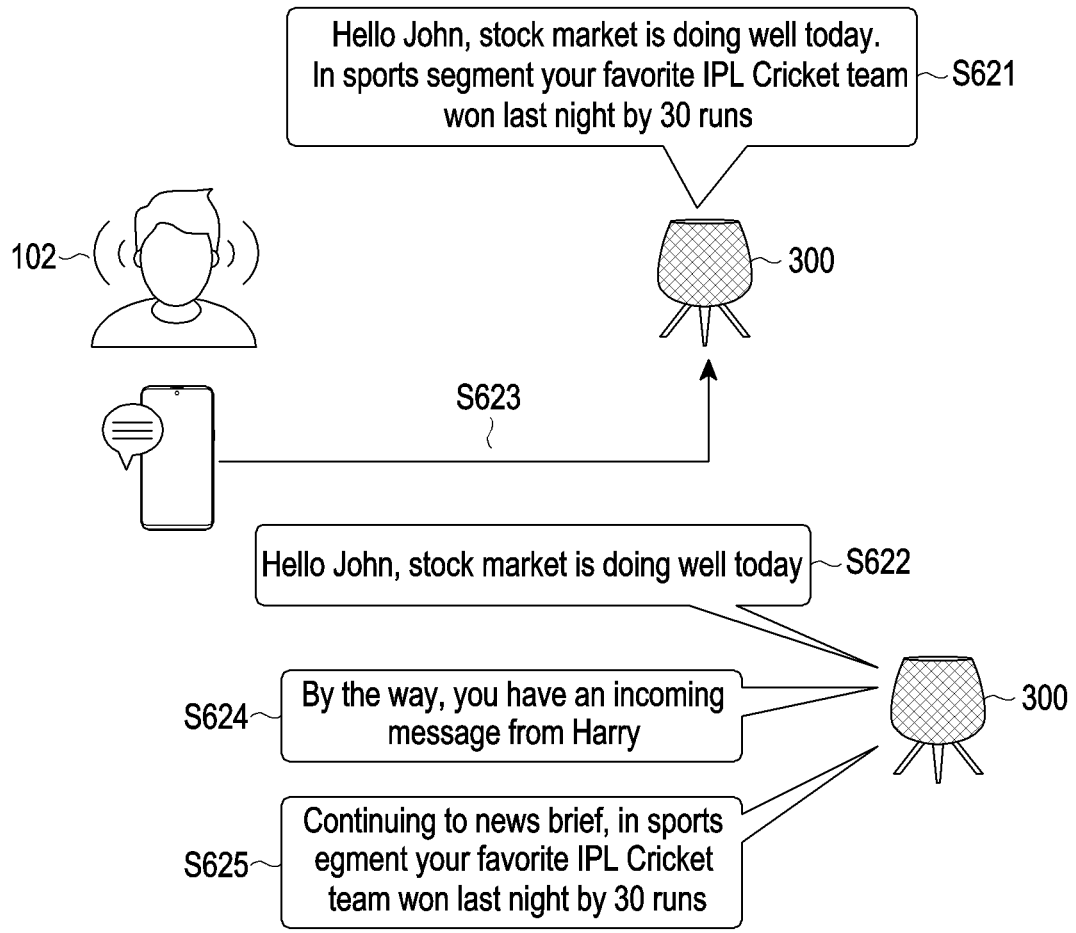

FIGS. 6A, and 6B show the schematic diagrams, illustrates a comparison between a conventional method and the proposed method by providing an example scenario for handling incoming message on the electronic device, according to an embodiment disclosed herein.

FIG. 6A illustrates an example scenario for handling incoming message on the electronic device by conventional methods. As seen in FIG. 6A the AI assistant device 104 is communicating with the user 102. Further, a mobile device 602 is communicatively coupled with the AI assistant device 104. In conventional method as illustrated in FIG. 6A, at step S611 the AI assistant device 104 generates a voice response related to news feed based on the user's voice query. The generated voice response is "Hello John, stock market is doing well today. In sports segment your favorite Indian Premier League (IPL) Cricket team won last night by 30 runs". This generated voice response is to be provided orally to the user 102 by the AI assistant device 104. At step S612, the AI assistant device 104, says "Hello John, Stock market is . . . " However, while providing the generated voice response to the user 102, the mobile device 104 has an incoming message at step S613. The AI assistant device 104 terminates providing the voice response and informs the user 102 about the incoming message saying "You have an incoming message from Harry". At step S615, the electronic device 100, resumes providing the voice response to the user, starting from the last point before informing about the incoming message.

FIG. 6B illustrates an example scenario for handling incoming message on the electronic device by proposed method. As seen in FIG. 6B the electronic device 300 is communicating with the user 102. At step S621, the electronic device 300 generates a voice response related to news feed based on the user's voice query. The voice generates voice response is "Hello John, stock market is doing well today. In sports segment your favorite IPL Cricket team won last night by 30 runs". This generated voice response is to be provided orally to the user 102 by the electronic device 300. The electronic device 300, says "Hello John, Stock market is . . . " While providing the generated voice response to the user 102, the mobile device 602 has an incoming message at step S623. The electronic device 300 delays the incoming message notification and completes a portion of the voice response saying "Hello John, the stock market is doing well today" at step S622. At step S624, the electronic device 300 provides information about the incoming message to the user saying "By the way, you have an incoming message from Harry". At step S625, the electronic device 300 resumes providing the voice response to the user saying the remaining generated voice response "Continuing to news brief, in sports segment your favorite IPL cricket team won last night by 30 runs". Thus the proposed method and system provide a human-like response to the user 102.

Figure 7A:
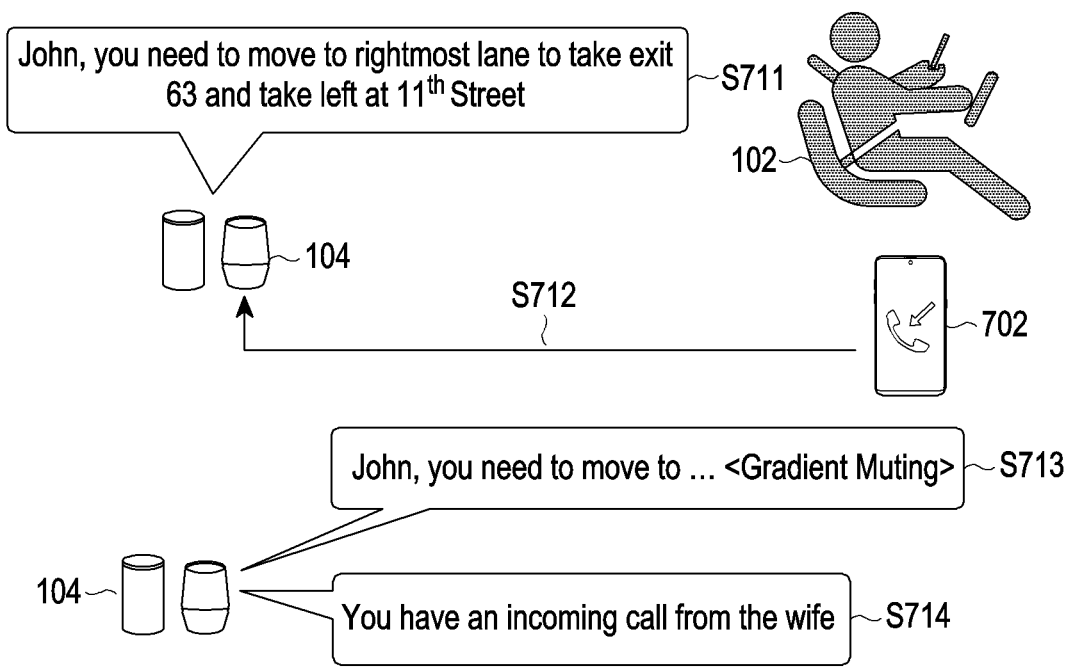
FIGS. 7A and 7B show the schematic diagrams, illustrating example for car voice AI assistants, according to an embodiment.
Figure 7B:
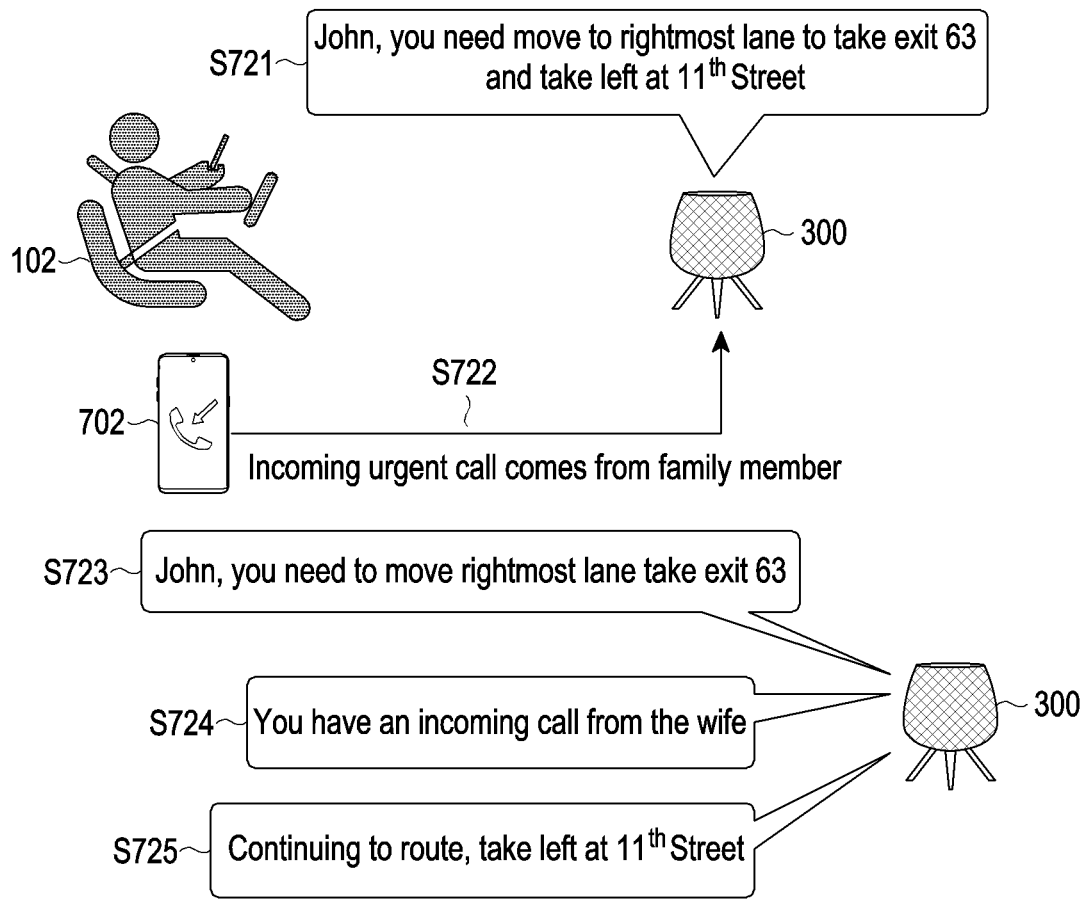

FIGS. 7A and 7B show the schematic diagrams, illustrating a comparison between conventional methods and proposed method by providing an example for car voice AI assistants, according to an embodiment disclosed herein.

As seen in FIG. 7A the user 102 is driving a car. The car includes an AI assistant device 104 for communicating with the user 102. Further, the AI assistant device is communicatively coupled to a mobile device 702. As seen in FIG. 7 at step S711 the AI assistant device 104 generates a voice response to a voice query received by the user 102. asking direction information. In the current example, the generated voice response is "John, you need to move rightmost lane to take exit 63 and take left at 11$^{th}$ street". Further, the AI assistant device 104 starts proving the generated response to the user 102 saying "John, you need to move." In the meantime, the user 102 receives a call on the user's mobile device 702 at step S712.

Further at step S713, the electronic device terminates providing voice response to the user 102. At step S714. the electronic device provides information about the incoming call to the user 102, saying "You have an incoming call from the wife". However as seen at step S711, the user has to take exit at 63, but the electronic device didn't inform the user 102 about it and hence the exit is missed by the user 102. The proposed method provides a solution to the problem by summarizing the current voice response to finish speaking in short time and then updating the generated voice response using NLG to indicate incoming call and resuming map guidance after the call.

As seen in FIG. 7B at step S721, the electronic device 300 generates a voice response to a voice query received by the user 102 asking direction information. In the current example, the generated voice response is "John, you need to move rightmost lane to take exit 63 and take left at 11$^{th}$ street", Further, the AI assistant device 300 starts proving the generated response to the user 102 saying "John, you need to move . . . " In the meantime the user 102 receives a call on the user's mobile device 702 at step S722. The mobile device 702 and the AI assistant device 300 are communicatively coupled with each other.

Further at step S723, the electronic device modifies the generated voice response by summarizing the generated voice response to finish speaking in a shorter time by the electronic device 300. Thus, at step S723, the electronic device completes providing a part of the voice response saying "John, you need to move rightmost lane to take exit 63". At step S724, the electronic device 300 informs the user about the incoming call from the wife and at step S725, the electronic device 300 resumes the generated voice response "continuing to route, take left at 11th street". Thus the user 102 does not miss the exit at 63 and also is informed about the incoming call from wife in timely manner.

According to various embodiments of the present disclosure, an event requiring immediate action, such as an incoming urgent call or a navigation message, is an important task and may be determined to have a relatively high priority. Further, an event that can be confirmed later, for example which does not require immediate action, such as a reservation confirmation message, may be determined to have a relatively low priority.

The priority of each event can be set and changed by the system or the user. For example, a default priority assigned by the original equipment manufacturer (OEM) can be updated by learning user behavior based on the machine learning algorithm by the system. In addition, the user may always override previous priority set for the each event, and designate a new priority for the each event.

For example, incoming calls and navigation message may have an equal priority initially by the OEM. If the user continues rejecting incoming calls except for the wife's call while driving with the navigation for few days, the electronic device 300 may determine the priority of the wife's call to be higher over the priority of the navigation message based on learning user behavior. The electronic device 300 may summarize a current sentence being provided in the current dialog, and immediately notify the wife's call. Other known person's call, aside from the wife's call, may be determined to have a medium priority. In this case, the electronic device 300 may finish the current sentence, and switch to notify the incoming call afterward. Unknown number calls, such as spam calls, may be determined. to have a low priority, and the electronic device 300 may ignore the unknown number calls during the current dialog. Thereafter, when the user updates the priority of a call from his boss to be higher, the boss's call may be treated as a high priority similar to the wife's call.

According to various embodiments of the present disclosure, when the electronic device 300 detects occurrence of an event while communicating with the user, some portions of words included in the original voice response generated by the electronic device 300 may be extracted and summarized. The words may include a specific sentence or a stop position identified based on natural language processing (NLP). The summarized voice response may be generated differently according to the priority of the event. For example, when the user asks "How is the weather today?", the electronic device 300 may generate "Hello John, the weather today reaches 25 degrees maximum. It is mostly sunny and there is a light chance of drizzle in the later part of the day" as the original voice response. When the electronic device 300 detects occurrence of an event having a medium priority while communicating with the user, the electronic device 300 may extract 'Hello John', 'weather', 'reaches 25 degrees maximum. It is mostly sunny and', 'chance of drizzle' and 'later' from the original voice response, and generate the summarized voice response "Hello John, weather reaches 25 degrees maximum. It is mostly sunny and chance of drizzle later" by connecting the extracted words. When the electronic device 300 detects occurrence of an event having a high priority while communicating with the user, the electronic device 300 may extract 'Hello John', 'weather', 'mostly sunny and' and 'chance of drizzle' from the original voice response, and generate the summarized voice response "Hello John, weather mostly sunny and chance of drizzle".

According to various embodiments of the present disclosure, when the electronic device 300 detects occurrence of the event, the electronic device 300 may summarize a sentence after the point where the event occurred in the original voice response. For example, if the event having a medium priority occurs at 20% completion point of the original voice response (e.g., after 'the weather'), the electronic device 300 may summarize the sentence after the point 'the weather', and generate the summarized voice response "Hello John, the weather reaches 25 degrees maximum. it is mostly sunny and chance of drizzle later". For another example, if the event having a high priority occurs at 60% completion point of the original voice response (e.g., after 'mostly sunny'), the electronic device 300 may summarize the sentence after the point 'mostly sunny', and generate the summarized. voice response "Hello John, the weather today reaches 25 degrees maximum. It is mostly sunny and chance of drizzle". When the event having the high priority occurs at 80% completion point of the original voice response (e.g., after 'a light chance'), the electronic device 300 generate the summarized voice response "Hello John, the weather today reaches 25 degrees maximum. It is mostly sunny and there is a light chance of drizzle".

Figure 8A:
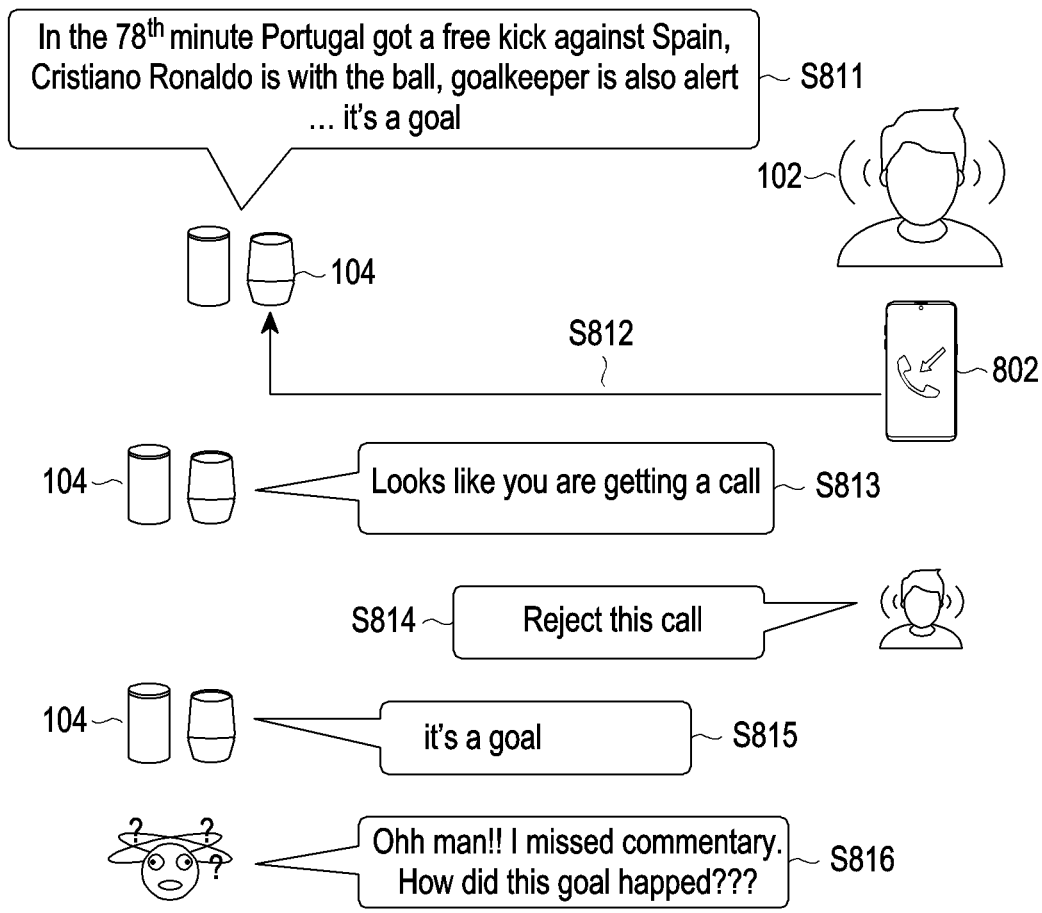
FIGS. 8A and 8B are schematic diagrams, illustrating example scenario for event handling by the electronic device with AI assistants according to an embodiment.
Figure 8B:
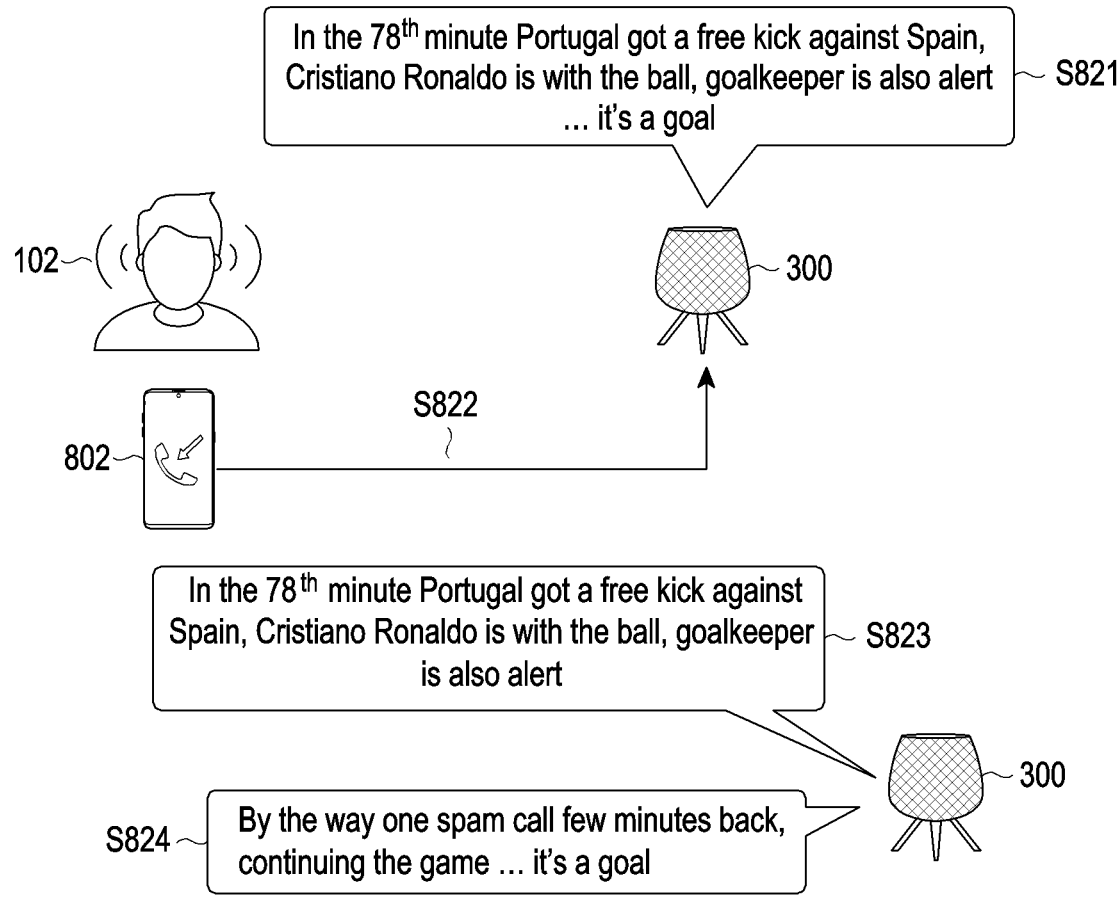

FIGS. 8A and 8B are schematic diagrams, illustrating a comparison between conventional methods and proposed method in an example scenario for personalized event handling by the electronic device with AI assistants according to an embodiment as disclosed herein.

As seen in FIG. 8A at step S811 the AI assistant device 104 generates a voice response to a voice query received by the user 102 asking about the football match information. In the current example, the generated voice response is "in the 78th minute, Portugal got a free kick against Spain. Cristiano Ronaldo is with the ball, goalkeeper is also alert. It's a goal". In step S812, meantime the user 102 receives a call on the user's mobile device 802. The mobile device 802 includes AI assistant devices for communicating with the user 102 at step S812.

Further at step S813, the electronic device provides information about the incoming call to the user 102, saying "looks like you are getting a call". At step S814, the user 102 replies saying reject the call. At step S815, the electronic device provides the generated voice response to the user 102 saying "it's a goal". However the electronic device 100, didn't inform the user about the initial portions of the generated voice response including information about the commentary previous to the goal. At S816, the user is sad. saying "Ohh man!! I missed commentary. How did this goal happen?".

FIG. 8B illustrates an example scenario for handling personalized event on the electronic device by proposed method. As seen in FIG. 8A. at step S821 the AI assistant device 300 generates a voice response to a voice query received by the user 102 asking about the football match information. In the current example, the generated voice response is "In the 78th minute, Portugal got a free kick against Spain. Cristiano Ronaldo is with the ball, goalkeeper is also alert. It's a goal". In the meantime the user 102 receives a call on the user's mobile device 802 at step S822. The mobile device 802 includes AI assistant devices for communicating with the user 102. The electronic device 300 determines that the incoming call is a spam call.

Further at step S823, the electronic device 300 provides the generated voice response to the user 102, saying "In the 78$^{th}$ minute, Portugal got a free kick against Spain. Cristiano Ronaldo is with the ball, goalkeeper is also alert". At step S824, the electronic device 300 provides the information about the incoming call, by modifying the remaining voice response saying "By the way one spam call few minutes back, continuing the game it's a goal". Thus the user 102 is informed about the incoming call as well as the entire generated voice response in timely manner.

Figure 9A:
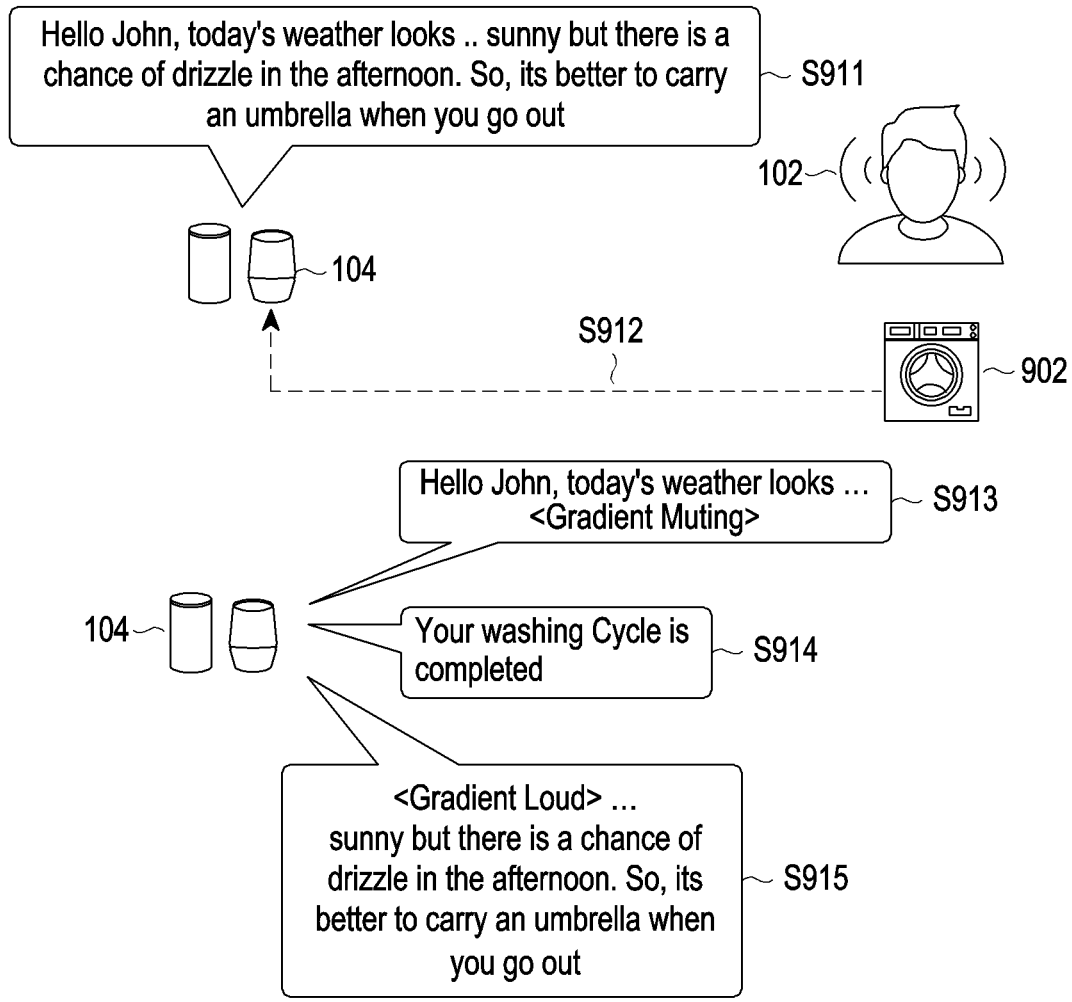
FIGS. 9A and 9B are schematic diagrams, illustrating example scenario for resuming dialogue after an event by the AI assistants according to an embodiment.
Figure 9B:
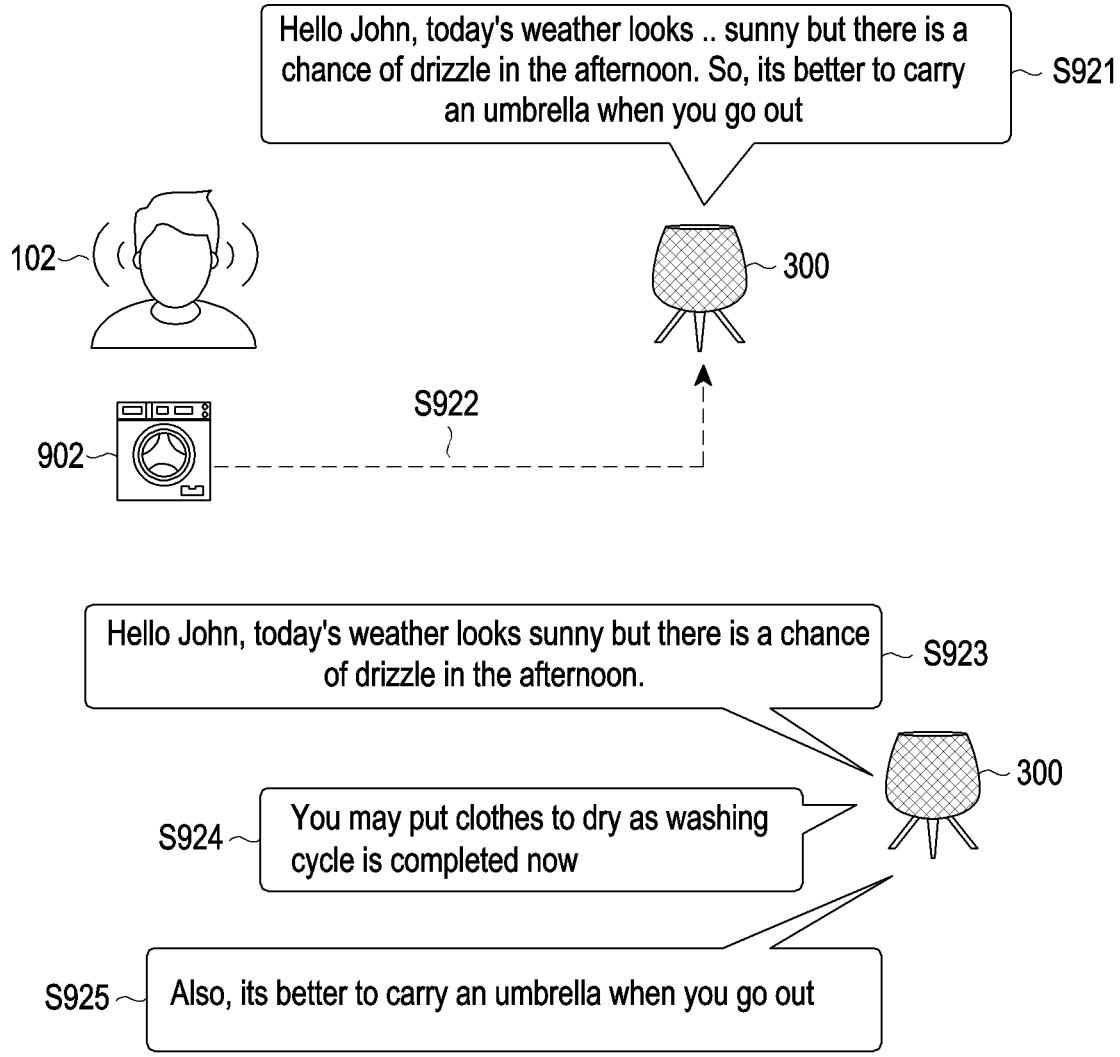

FIGS. 9A and 9B are schematic diagrams, illustrating a comparison between conventional methods and proposed method in an example scenario for resuming dialogue after important event by the electronic device according to an embodiment as disclosed herein.

FIG. 9A illustrates an example scenario for resuming dialogue after an important event on the electronic device by proposed method. As seen in FIG. 9A at step S911 the AI assistant device 104 generates a voice response to a voice query received by the user 102 asking about the weather information. In the current example, the generated voice response is "Hello John, Today's weather looks sunny but there is a chance of drizzle in the afternoon. So, it's better to carry an umbrella when you go out". At step S913, the AI assistant device 104, provides the generated voice response to the user 102, saying "Hello John, Today's weather looks . . . " Meanwhile at step S912, the AI assistant device 104 receives a notification by a washing machine 902, informing that the washing is completed. At step S914, the AI assistant device 104 terminates providing voice response to the user 102, and provides information about the incoming message from the washing machine to the user 102, saying "Your washing cycle is completed". Further at step S915, the AI assistant device 104 resumes providing the voice response to the user 102 saying "sunny but there is a chance of drizzle in the afternoon. So it's better to carry an umbrella when you go out."

As seen in FIG. 9B at step S921 the electronic device 300 generates a voice response to a voice query received by the user 102 asking weather information. In the current example, the generated voice response is "Hello John, today's weather looks sunny but there is a chance of drizzle in the afternoon. So, it's better to carry an umbrella when you go out". At step S923, the electronic device 300, provides the generated voice response to the user 102, saying "Hello John, today's weather looks . . . " Meanwhile at step S922, the electronic device 300, receives a notification by a washing machine 902, informing that the washing is completed. At step S923, the electronic device 300 continues providing a portion of the voice response saying "Hello John, Today's weather looks sunny but there is a chance of drizzle in the afternoon" to the user 102. At step S924, the electronic device 300 provides information about the incoming message from the washing machine to the user 102 saying "You may put clothes to thy as washing cycle is completed". Further at step S925, the electronic device 300 resumes providing the voice response to the user 102 by modifying the generated voice response and saying "Also its better to carry an umbrella when you go out." Thus the proposed method and system provide a human-like response to the user 102.

Figure 10:
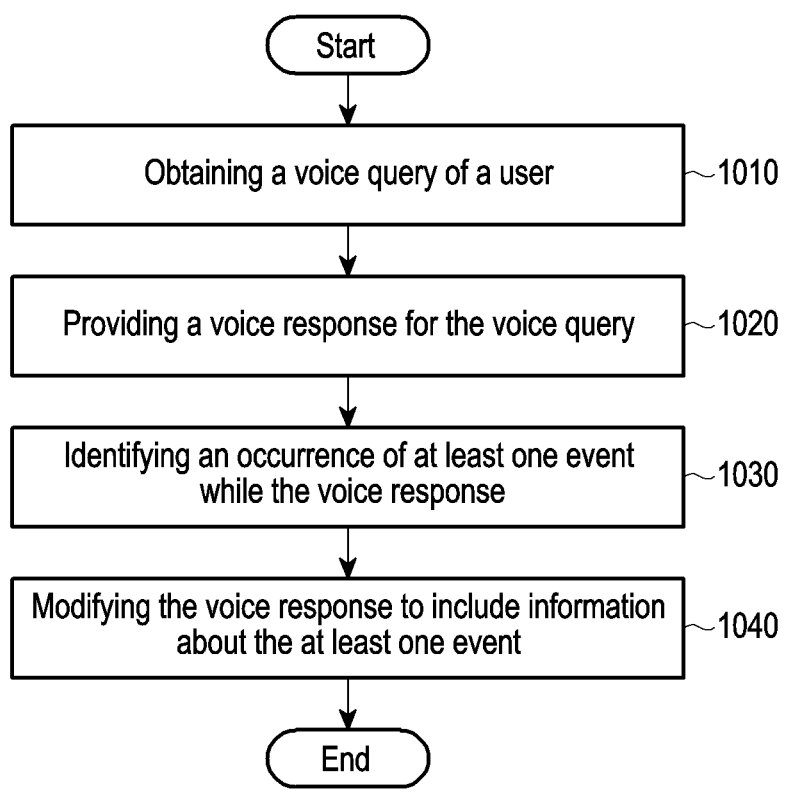
FIG. 10 is a flowchart, illustrating a method for processing a dialog between the user and the electronic device, according to an embodiment.

FIG. 10 is a flowchart 1000, illustrating a method for processing a dialog between a user and an electronic device, according to embodiments as disclosed herein. In an embodiment, the method may be executed by at least one processor 320 of the electronic device 300.

At a block 1010, the method includes obtaining a voice query of the user. in an embodiment, the electronic device may receive the voice query from the user asking "How is the weather today".

At a block 1020, the method includes providing a voice response for the voice query. In an embodiment, the method may include generating the voice response based on the voice query obtained from the user, and providing the voice response to the user. The voice response may include a plurality of portions. For example, the voice response may include the plurality of portions such as "Hello John, the weather looks sunny, with a chance of drizzle later.", including "Hello John" being a first portion of the voice response, "the weather looks sunny" being a second portion and "with a chance of drizzle later" being a third portion.

At a block 1030, the method includes identifying an occurrence of at least one event while providing the voice response. The at least one event may be for example but not limited to an incoming call, a text message, a notification on the electronic device 300 and the like. At a block 1040, the method includes modifying the voice response to include information about the at least one event.

In some embodiments, the method may include determining a first priority associated with the at least one event and a second priority associated with the voice response, and providing the modified voice response including the information about at least one event based on the first priority and the second priority, For example, the electronic device 300 may compare the first priority with the second priority, and determine whether to provide the information about the at least one event at time of 'along with the voice with the voice response' or 'after the voice response', based on a result of the comparison. In response to determining that the information about the at least one event is to be provided 'along with the voice response', the electronic device 300 may modify the voice response by including the information about the at least one event at at-least one portion of the plurality of portions of the voice response, and provide the modified voice response, In response to determining that the information about the at least one event is to be provided 'after the voice response', the electronic device 300 may provide the voice response and the information about the at least one event successively. In one or more embodiments, the electronic device 300 may recognize a context of the at least one event, and determine the first priority associated with the at least one event based on the context of the at least one event, The electronic device 300 may also recognize a context of the voice response, and determine the second priority associated with the at least one voice response based on the context of the voice response.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein can he practiced with modification within the spirit and scope of the disclosure.

What is claimed is:

1. A method for processing, by an electronic device, a dialog between a user and the electronic device, the method comprising:
    obtaining a voice query of the user;
    generating a voice response for the voice query, the voice response including a plurality of portions;
    providing a portion from among the plurality of portions included in the voice response;
    detecting an occurrence of at least one event, wherein the at least one event occurs while the portion is being provided;
    modifying at least one portion from among the plurality of portions included in the voice response to include information about the at least one event which occurred while the portion of the voice response is being provided; and
    providing the modified at least one portion including the information.

2. The method of claim 1, wherein the modifying the voice response comprises:
    determining a first priority associated with the at least one event and a second priority associated with the voice response; and
    providing the modified at least one portion including the information about the at least one event, based on the first priority and the second priority.

3. The method of claim 2, wherein the providing the modified at least one portion comprises:
    comparing the first priority with the second priority; and
    determining whether to provide the information about the at least one event along with the voice response or after the voice response, based on a result of the comparing.

4. The method of claim 3, further comprising:
    based on determining to provide the information about the at least one event along with the voice response, modifying the voice response by including the information about the at least one event in the at least one portion of the plurality of portions of the voice response; and
    providing the modified at least one portion.

5. The method of claim 3, further comprising:
based on determining to provide the information about the at least one event after the voice response, providing the voice response and subsequently providing the information about the at least one event.

6. The method of claim 2, wherein the determining the first priority comprises:
identifying a context of the at least one event; and
determining the first priority associated with the at least one event based on the context of the at least one event.

7. The method of claim 2, wherein the determining the second priority comprises:
identifying a context of the voice response; and
determining the second priority associated with the voice response based on the context of the voice response.

8. The method of claim 1, wherein the at least one event comprises at least one from among an incoming message, an incoming call, a navigation instruction, a weather event, a sports event, and a financial event.

9. The method of claim 1, further comprising determining, by the electronic device, whether to provide the information about the at least one event along with the voice response or after the voice response, based on priorities of the voice response and the at least one event.

10. An electronic device for processing a dialog between a user and the electronic device, the electronic device comprising:
a memory configured to store instructions; and
at least one processor coupled to the memory and configured to execute the instructions to:
obtain a voice query of the user,
generating a voice response for the voice query, the voice response including a plurality of portions,
provide a portion from among the plurality of portions included in the voice response,
detect an occurrence of at least one event, wherein the at least one event occurs while the portion is being provided,
modify at least one portion from among the plurality of portions included in the voice response to include information about the at least one event which occurred while the portion of the voice response is being provided, and
provide the modified at least one portion including the information.

11. The electronic device of claim 10, wherein the at least one processor is further configured to execute the instructions to:
determine a first priority associated with the at least one event and a second priority associated with the voice response, and
provide the modified at least one portion including the information about the at least one event, based on the first priority and the second priority.

12. The electronic device of claim 11, wherein the at least one processor is further configured to execute the instructions to:
compare the first priority with the second priority, and
determine whether to provide the information about the at least one event along with the voice response or after the voice response, based on a result of the comparison.

13. The electronic device of claim 12, wherein the at least one processor is further configured to execute the instructions to:
based on determining to provide the information about the at least one event along with the voice response, modify the voice response by including the information about the at least one event in the at least one portion of the plurality of portions of the voice response, and provide the modified at least one portion, and
based on determining to provide the information about the at least one event is to be provided after the voice response, provide the voice response and then subsequently the information about the at least one event.

14. The electronic device of claim 11, wherein the at least one processor is further configured to execute the instructions to:
identify a context of the at least one event; and
determine the first priority associated with the at least one event based on the context of the at least one event.

15. The electronic device of claim 11, wherein the at least one processor is further configured to execute the instructions to:
identify a context of the voice response; and
determine the second priority associated with the voice response based on the context of the voice response.

16. A non-transitory computer readable medium comprising program code for processing a dialog between a user and an electronic device that, when executed by at least one processor, causes the electronic device to:
obtain a voice query of the user;
generate a voice response for the voice query, the voice response including a plurality of portions;
provide a portion from among the plurality of portions included in the voice response;
while providing the portion, detect an occurrence of at least one event, wherein the at least one event occurs while the portion is being provided;
modify at least one portion from among the plurality of portions included in the voice response to include information about the at least one event which occurred while the portion of the voice response is being provided; and
provide the modified at least one portion including the information.

17. The non-transitory computer readable medium of claim 16, wherein the program code further causes the electronic device to:
determine a first priority associated with the at least one event and a second priority associated with the voice response; and
provide the modified at least one portion including the information about the at least one event, based on the first priority and the second priority.

18. The non-transitory computer readable medium of claim 17, wherein the program code further causes the electronic device to:
compare the first priority with the second priority; and
determine whether to provide the information about the at least one event along with the voice response or after the voice response, based on a result of the comparison.

19. The non-transitory computer readable medium of claim 18, wherein the program code further causes the electronic device to:
identify a context of the at least one event; and
determine the first priority associated with the at least one event based on the context of the at least one event.

* * * * *